United States Patent
Deng

(10) Patent No.: US 9,513,063 B2
(45) Date of Patent: Dec. 6, 2016

(54) DUAL-LOOP CIRCULATION COOLING SYSTEM FOR OVEN OF LIQUID CRYSTAL MANUFACTURE PROCESS

(75) Inventor: Hongtao Deng, Guangdong (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 898 days.

(21) Appl. No.: 13/515,285

(22) PCT Filed: May 10, 2012

(86) PCT No.: PCT/CN2012/075276
§ 371 (c)(1),
(2), (4) Date: Jun. 11, 2012

(87) PCT Pub. No.: WO2013/159403
PCT Pub. Date: Oct. 31, 2013

(65) Prior Publication Data
US 2013/0284407 A1    Oct. 31, 2013

(30) Foreign Application Priority Data

Apr. 28, 2012  (CN) .......................... 2012 1 0133092

(51) Int. Cl.
*F24H 3/00* (2006.01)
*F28D 15/00* (2006.01)
(Continued)

(52) U.S. Cl.
CPC ........ *F28D 15/00* (2013.01); *F28D 2021/0056* (2013.01); *F28D 2021/0077* (2013.01); *G02F 1/1303* (2013.01)

(58) Field of Classification Search
CPC .................. F28F 1/04; F28F 1/26; F28F 3/12; F28D 7/106; F28D 15/00; F28D 2021/0056; F28D 2021/0077; H05K 7/20509; H05K 7/20254; G02F 1/1303
See application file for complete search history.

(56) References Cited

U.S. PATENT DOCUMENTS 2,987,382 A * 6/1961 Friedrich Endter et al. . 422/655
4,179,884 A * 12/1979 Koeslin ........................ 60/321
(Continued)

FOREIGN PATENT DOCUMENTS

CN        201129463 Y    10/2008
CN        101407342 A *   4/2009
(Continued)

OTHER PUBLICATIONS

Hirai et al. www.hitachi.com_rev_pdf_2008_r2008_03_107 accessed Feb. 11, 2015; "One Drop Filling for Liquid Crystal Display Panel Produced from Larger-sized Mother Glass;" Authors: Akira Hirai, Isao Abe, Masaru Mitsumoto, Shigeru Ishida; Hitachi Review vol. 57 (2000) No. 24.*
(Continued)

*Primary Examiner* — Len Tran
*Assistant Examiner* — Gordon Jones
(74) *Attorney, Agent, or Firm* — Cheng-Ju Chiang

(57) ABSTRACT

Disclosed is a dual-loop circulation cooling system for an oven of a liquid crystal manufacture process, including a water pump, a water tank, a water drawing pipe, a water returning pipe, and a first cooling pipe and a second cooling pipe. The water pump, the water tank, the water drawing pipe, and the water returning pipe are arranged outside the oven. The first cooling pipe and the second cooling pipe are two juxtaposed cooling pipes that are arranged substantially parallel inside the oven. The water pump drives coolant contained in the water tank through the water drawing pipe into the first cooling pipe and the second cooling pipe inside
(Continued)

the oven, whereby the coolant removes heat from the oven and then returns through the water returning pipe back into the water tank. The coolant flows in the first cooling pipe and the second cooling pipe in opposite directions.

10 Claims, 2 Drawing Sheets

(51) Int. Cl.
*F28D 21/00* (2006.01)
*G02F 1/13* (2006.01)

(56) References Cited

U.S. PATENT DOCUMENTS

| | | | | |
|---|---|---|---|---|
| 4,401,409 A | * | 8/1983 | Torbica | F04D 9/02 |
| | | | | 415/151 |
| 4,781,241 A | * | 11/1988 | Misage et al. | 165/140 |
| 5,954,127 A | * | 9/1999 | Chrysler | F25B 39/024 |
| | | | | 165/164 |
| 7,222,801 B2 | * | 5/2007 | Meirana | F24D 3/12 |
| | | | | 165/49 |
| 2007/0218706 A1 | * | 9/2007 | Matsuoka | F27B 5/04 |
| | | | | 438/781 |
| 2008/0298933 A1 | * | 12/2008 | Hsiao et al. | 414/172 |
| 2010/0107683 A1 | * | 5/2010 | MacBain | F25B 1/00 |
| | | | | 62/510 |
| 2011/0174301 A1 | * | 7/2011 | Haydock et al. | 126/85 R |
| 2013/0126144 A1 | * | 5/2013 | Sheu et al. | 165/181 |

FOREIGN PATENT DOCUMENTS

| | | |
|---|---|---|
| CN | 201569300 U | 9/2010 |
| CN | 201686603 U * | 12/2010 |
| WO | WO 02100954 A1 * | 12/2002 |

OTHER PUBLICATIONS

CN 201686603 U (Ding et al.) machine translation.*
CN 101407342 A (Ma et al.) machine translation.*

* cited by examiner

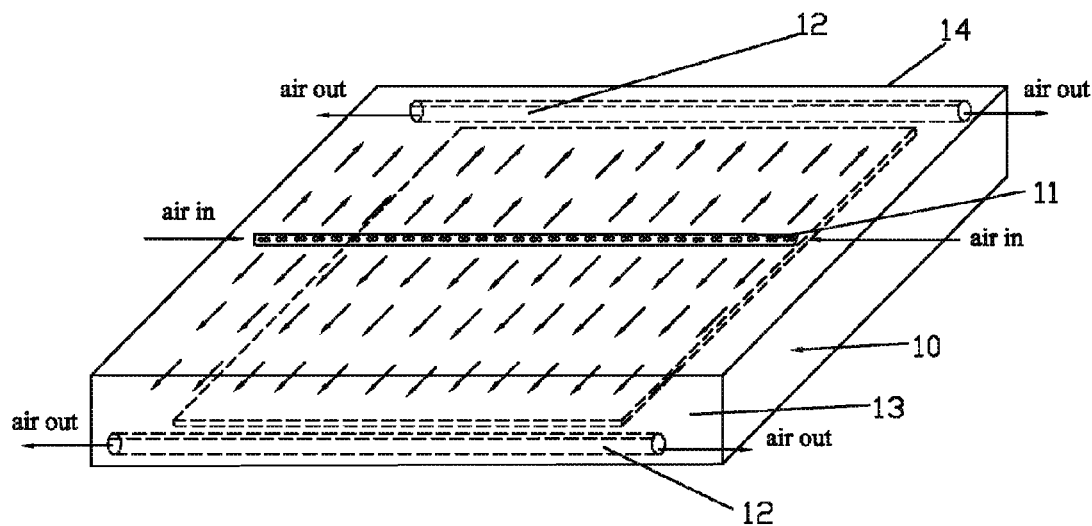
Fig. 1     (Prior Art)
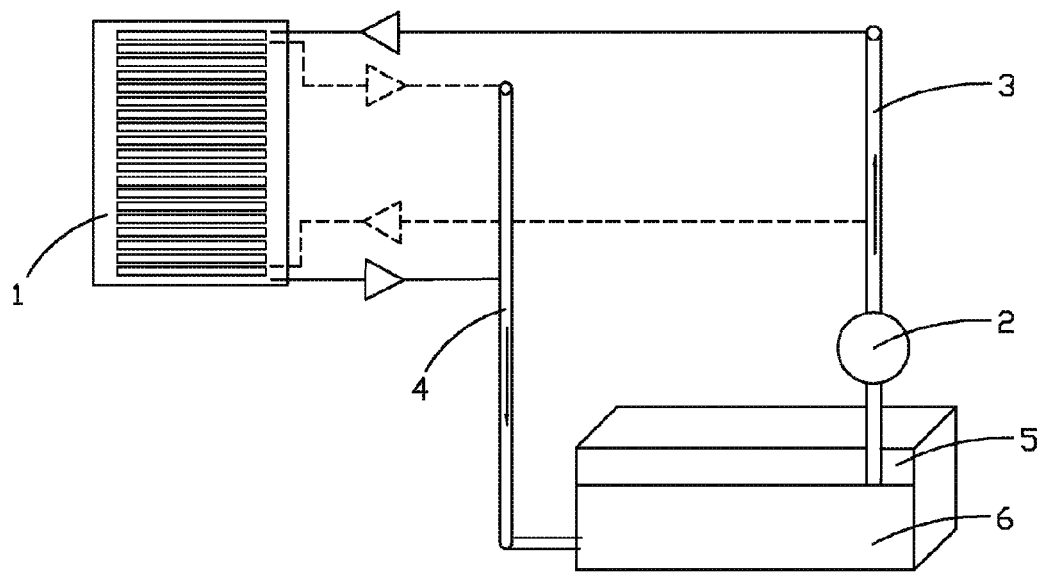
Fig. 2

DUAL-LOOP CIRCULATION COOLING SYSTEM FOR OVEN OF LIQUID CRYSTAL MANUFACTURE PROCESS

BACKGROUND OF THE INVENTION

1. Field of the Invention

The present invention relates to a cooling system, and in particular to a dual-loop circulation cooling system for an oven of a liquid crystal manufacture process.

2. The Related Arts

In a contemporary liquid crystal manufacture process, various steps, such as baking, curing, and annealing, require an oven for heating. Referring to FIG. 1, a schematic perspective view showing structure of a known oven used in a liquid crystal manufacture process is given. In a known oven 10 used in a contemporary liquid crystal manufacture process, to maintain cleanliness level of the oven 10, the oven 10 is often provided with an air supply/exhaust system, which draws in clean air through a purification pipe 11 in order to form a positive pressure inside the oven 10 and discharges air outward through air exhaust pipes 12. The direction of air flow is indicated by arrows. Further, the oven 10 has a shielding plate side 13 and a rear maintenance gate side 14, both of which are openable for access to the interior of the oven 10.

To ensure the quality of liquid crystal, the oven must be frequently maintained. Heretofore, to conduct maintenance of an oven used in a liquid crystal manufacture process, the internal temperature of the oven must be first lowered before manual maintenance operation can be carried out. However, the conventional way of lowering oven internal temperature is natural cooling, and it generally takes a long period of time (approximately 6 hours) to have temperature dropping from a high level of 150° C. (illustrative temperature) down to a level below 60° C. This becomes a bottle neck for the time-consuming operation of maintaining an entire liquid crystal manufacture line.

This is simply because the process of cooing takes a large amount of time and during such a period, due to such a high temperature, it is not possible for operators to carry out the desired maintenance operation. This is a period of dead time. Due to the excessive length of the dead time, the overall time period of oven maintenance is over extended. It usually takes at least a whole day to maintain a single oven and this makes the maintenance of the whole manufacture line extremely long.

SUMMARY OF THE INVENTION

Thus, an object of the present invention is to provide a dual-loop circulation cooling system that helps increasing temperature lowering rate inside an oven of a liquid crystal manufacture process.

To achieve the object, the present invention provides a dual-loop circulation cooling system for an oven of a liquid crystal manufacture process, comprising a water pump, a water tank, a water drawing pipe, a water returning pipe, and a first cooling pipe and a second cooling pipe. The water pump, the water tank, the water drawing pipe, and the water returning pipe are arranged outside the oven. The first cooling pipe and the second cooling pipe are two juxtaposed cooling pipes that are arranged substantially parallel inside the oven. The water pump drives coolant contained in the water tank through the water drawing pipe into the first cooling pipe and the second cooling pipe inside the oven, whereby the coolant removes heat from the oven and then returns through the water returning pipe back into the water tank. The coolant flows in the first cooling pipe and the second cooling pipe in opposite directions.

Wherein, the water pump comprises a self-suction water pump.

Wherein, the coolant comprises water recycled from an ODF liquid crystal process.

Wherein, the water tank functions as a buffer for water recycled from an ODF liquid crystal process for use in a beveling operation.

Wherein, the first cooling pipe and the second cooling pipe are stainless steel pipes.

Wherein, the first cooling pipe and the second cooling pipe are ceramic pipes.

Wherein, the first cooling pipe is arranged inside an exhaust pipe in the oven.

Wherein, the second cooling pipe is arranged inside an exhaust pipe in the oven, Wherein, the first and second cooling pipes are arranged inside an exhaust pipe in the oven.

Wherein, the first and second cooling pipes are configured in a folded form of square wave.

The present invention provides a dual-loop circulation cooling system for an oven of a liquid crystal manufacture process can speed up oven temperature dropping rate and reduce dead time period for temperature lowering thereby shortening the maintenance time of an entire manufacture line and improving production efficiency. The present invention uses a coolant water circulation system that comprises a dual-loop coolant water circulation system additionally installed in an oven, whereby through operation of a water pump to pump water from a buffer tank to the oven, uniform temperature drop can be achieved for the entire oven with hardly any added expense. Modification can be made on an existing oven to obtain bettered cooling effect with a limited amount of expense.

BRIEF DESCRIPTION OF THE DRAWINGS

The technical solution, as well as beneficial advantages, will be apparent from the following detailed description of an embodiment of the present invention, with reference to the attached drawings. In the drawings:

FIG. 1 is a schematic perspective view showing structure of a known oven used in a liquid crystal manufacture process;

FIG. 2 is a schematic view showing structure of a dual-loop circulation cooling system for an oven of a liquid crystal manufacture process according to a preferred embodiment of the present invention;

DETAILED DESCRIPTION OF THE PREFERRED EMBODIMENTS

Figure 3:
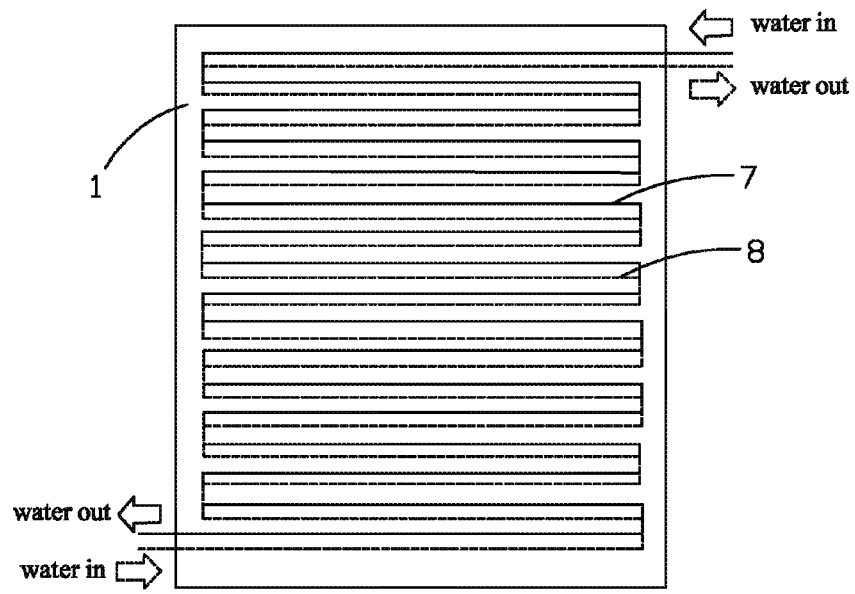
FIG. 3 is a schematic view showing structure of first and second cooling pipes of the dual-loop circulation cooling system an oven of a liquid crystal manufacture process according to the preferred embodiment of the present invention.

Referring to FIG. 2, a schematic view showing structure of a dual-loop circulation cooling system for an oven of a liquid crystal manufacture process according to a preferred embodiment of the present invention is given. The dual-loop circulation cooling system for an oven of a liquid crystal manufacture process comprises a water pump 2, a water tank 5, a water drawing pipe 3, a water returning pipe 4, and a first cooling pipe and a second cooling pipe. The oven 1 is provided externally with the water pump 2 and associated circulation pipes including the water drawing pipe 3 and the water returning pipe 4. A self-suction water pump 2 that requires no filling of water is adopted here for pumping recycled water 6 stored in the water tank 5 to a cooling system arranged inside the oven 1 for removing heat and to be then discharged back into the water tank 5. The recycled water 6 is water collected from an ODF (One Drop Fill) liquid crystal process to serve as a coolant. The nature of low temperature and high specific heat of the coolant water is used to timely dissipate heat from the oven 1 so as to efficiently lower the oven temperature. The coolant is the water recycled from an existing liquid crystal manufacture process, allowing the recycled water to be repeatedly usable and thus lowering down cost. The recycled water 6 flows in the water drawing pipe 3 and the water returning pipe 4 by following the directions indicated by arrows, whereby the water follows the solid-line triangles arrows to flow through the first cooling pipe inside the oven 1 and follows the phantom-line triangles to flow through the second cooling pipe inside the oven 1. The water tank 5 functions as a buffer for the water recycled from a washing machine of the ODF liquid crystal process for subsequent use in a beveling operation thereby achieving high efficiency cyclic use of the water. The dual-loop cooling water circulation system can be installed on an existing oven with hardly any added expense and can be realized on the basis of the existing liquid crystal manufacture process.

Referring to FIG. 3, a schematic view showing structure of the first and second cooling pipes of the dual-loop circulation cooling system oven of a liquid crystal manufacture process according to the preferred embodiment of the present invention is given. The first cooling pipe 7 and the second cooling pipe 8 are two juxtaposed cooling pipes that are arranged substantially parallel inside the oven 1. The first cooling pipe 7 and the second cooling pipe 8 can be arranged in a folded form of "square wave". The dual-loop circulation is adopted for the purposes of efficient cooling and similar cooling rate and is arranged in such a way that the two juxtaposed and parallel cooling pipes are coupled to topmost and bottommost sections of the oven 1, whereby the first cooling pipe 7 and the second cooling pipe 8 juxtapose each other to be completely or substantially parallel to each other with the coolant water flowing in the two pipes in opposite direction to achieve the result of increased temperature lowering rate and uniform temperature drop of the whole oven 1 to prevent occurrence of undesired accidents. The first cooling pipe 7 and the second cooling pipe 8 can be made of stainless steel pipes or ceramic pipes of high strength and high temperature resistance. The configuration of the cooling pipes is made as long as possible to achieve bettered cooling effect. The two cooling pipes are of substantially the same configuration and arrangement and conduct water flowing in opposite direction so as to ensure uniform temperature drop.

Figure 4:
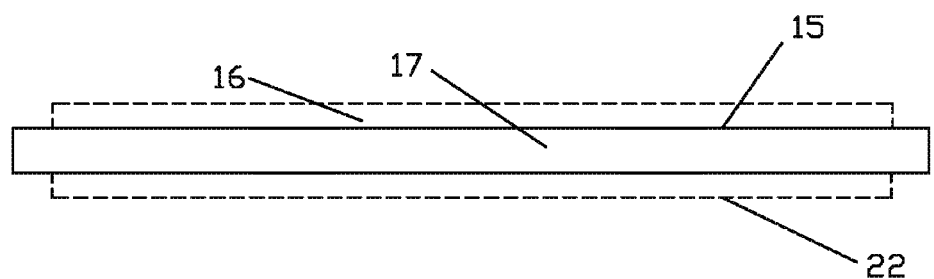
FIG. 4 is a side elevational view showing an exhaust pipe formed according to the present invention by modifying an existing oven of a liquid crystal manufacture process.
Figure 5:
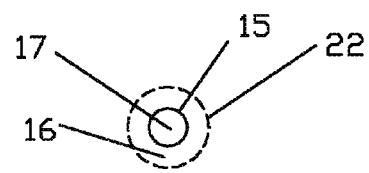
FIG. 5 is an end view of the exhaust pipe shown in FIG. 4.

Modification can be made on an existing structure of the oven 1 in order to achieve bettered cooling effect with a limited amount of expense. Referring to FIGS. 4 and 5, FIG. 4 is a side elevational view showing an exhaust pipe formed according to the present invention by modifying an existing oven of a liquid crystal manufacture process and FIG. 5 is an end view of the exhaust pipe shown in FIG. 4. The exhaust pipe 22 is an existing pipe arranged inside an oven. The modification can be carried out by just changing the exhaust pipe 22 through setting a newly-added cooling pipe 15 inside the exhaust pipe 22, whereby a gas discharge passage 16 is formed between the exhaust pipe 22 and the cooling pipe 15 and a cooling water passage 17 is formed in the cooling pipe 15. With this arrangement, the exhaust system can operate normally during manufacture and the cooling pipe 15 can be used in maintenance to remove heat and ensure fast cooling of the oven. Based on the actual arrangement of exhaust pipe inside an existing oven of liquid crystal manufacture process, the dual-loop cooling pipes can be completely set up inside an exhaust pipe or alternatively a portion of the dual-loop cooling pipes is set up inside the exhaust pipe, while the remaining portion is located outside the exhaust pipe. Through the modification of an existing oven, the expenses of new installation and replacement of the oven can be saved.

In summary, using the dual-loop circulation cooling system for an oven of a liquid crystal manufacture process according to the present invention to lower down oven temperature allows effective speed-up of the oven cooling process, saving of facility maintenance time, and increase of production efficiency. The present invention provides a dual-loop coolant water circulation system to be additionally installed in an oven with hardly any added expense and being capable of uniform temperature drop of the whole oven. Modification can be made on an existing oven to obtain bettered cooling effect with a limited amount of expense.

Based on the description given above, those having ordinary skills of the art may easily contemplate various changes and modifications of the technical solutions and technical ideas of the present invention and all these changes and modifications are considered within the protection scope of right claimed for the present invention.

What is claimed is:

1. A dual-loop circulation cooling system for an oven of a liquid crystal manufacture process, comprising a water pump, a water tank, a water drawing pipe, a water returning pipe, and a first cooling pipe and a second cooling pipe, which are each configured in a folded form of square wave comprising multiple folds each comprising two parallel major sections and one minor section perpendicular to and connected between the two major sections, the water pump, the water tank, the water drawing pipe, and the water returning pipe being arranged outside the oven that comprises a first side wall and a second side wall opposite to and spaced from each other and a third side wall and a fourth sidewall opposite to and spaced from each other and respectively connected between ends of the first and second side walls to define an interior space of the oven, the first cooling pipe and the second cooling pipe being two juxtaposed cooling pipes that are arranged substantially parallel in the interior space of the oven such that the major sections of the multiple folds of square wave are substantially parallel to the third and fourth side walls and the minor sections are substantially parallel to the first and second side walls, the first cooling pipe having an inlet mounted to the first side wall of the oven and an outlet mounted to the second side wall of the oven, the second cooling pipe having an inlet mounted to the second side wall of the oven and an outlet mounted to the first side wall of the oven such that the major sections of the multiple folds of square wave of the first and second cooling pipes are in a direction substantially perpendicular to the first and second side walls and the inlets of the first and second cooling pipes are opposite to and spaced from each other and the outlets of the first and second cooling pipes are opposite to and spaced from each other, wherein the multiple folds of square wave of the first cooling pipe are arranged between the third and fourth side walls and are distributed from the third side wall toward the fourth side wall, while the multiple folds of square wave of the second cooling pipe are arranged between the third and fourth side walls and are distributed from the fourth side wall toward the third side wall such that the inlets of the first and second cooling pipes that are respectively mounted to the first and second side walls are spaced from each other in a direction normal to the first and second side walls and are also spaced from each other in a direction normal to the third and fourth side walls, the water pump driving coolant contained in the water tank through the water drawing pipe into the first cooling pipe and the second cooling pipe inside the oven, wherein the coolant is introduced into the inlets of the first and second cooling pipes to flow through the first and second cooling pipes in opposite directions and thus removes heat from the oven and then discharged from the outlet of the first and second cooling pipes at opposite sides of the oven and to return through the water returning pipe back into the water tank.

2. The dual-loop circulation cooling system for an oven of a liquid crystal manufacture process as claimed in claim 1, wherein the water pump comprises a self-priming water pump.

3. The dual-loop circulation cooling system for an oven of a liquid crystal manufacture process as claimed in claim 1, wherein the coolant comprises water recycled from a one drop fill (ODF) liquid crystal process.

4. The dual-loop circulation cooling system for an oven of a liquid crystal manufacture process as claimed in claim 1, wherein the water tank functions as a buffer water storage for water recycled from a one drop fill (ODF) liquid crystal process for use in a beveling operation.

5. The dual-loop circulation cooling system for an oven of a liquid crystal manufacture process as claimed in claim 1, wherein the first cooling pipe and the second cooling pipe are stainless steel pipes.

6. The dual-loop circulation cooling system for an oven of a liquid crystal manufacture process as claimed in claim 1, wherein the first cooling pipe and the second cooling pipe are ceramic pipes.

7. The dual-loop circulation cooling system for an oven of a liquid crystal manufacture process as claimed in claim 1, wherein the first cooling pipe is received in and extending inside an exhaust pipe of the oven so that a gas discharge passage is formed between the exhaust pipe and the first cooling pipe.

8. The dual-loop circulation cooling system for an oven of a liquid crystal manufacture process as claimed in claim 1, wherein the second cooling pipe is received in and extending inside an exhaust pipe of the oven so that a gas discharge passage is formed between the exhaust pipe and the second cooling pipe.

9. The dual-loop circulation cooling system for an oven of a liquid crystal manufacture process as claimed in claim 1, wherein the first and second cooling pipes are received in and extending inside an exhaust pipe of the oven so that a gas discharge passage is formed between the exhaust pipe and the first and second cooling pipes.

10. A dual-loop circulation cooling system for an oven of a liquid crystal manufacture process, comprising a water pump, a water tank, a water drawing pipe, a water returning pipe, and a first cooling pipe and a second cooling pipe, which are each configured in a folded form of square wave comprising multiple folds each comprising two parallel major sections and one minor section perpendicular to and connected between the two major sections, the water pump, the water tank, the water drawing pipe, and the water returning pipe being arranged outside the oven that comprises a first side wall and a second side wall opposite to and spaced from each other and a third side wall and a fourth sidewall opposite to and spaced from each other and respectively connected between ends of the first and second side walls to define an interior space of the oven, the first cooling pipe and the second cooling pipe being two juxtaposed cooling pipes that are arranged substantially parallel in the interior space of the oven such that the major sections of the multiple folds of square wave are substantially parallel to the third and fourth side walls and the minor sections are substantially parallel to the first and second side walls, the first cooling pipe having an inlet mounted to the first side wall of the oven and an outlet mounted to the second side wall of the oven, the second cooling pipe having an inlet mounted to the second side wall of the oven and an outlet mounted to the first side wall of the oven such that the major sections of the multiple folds of square wave of the first and second cooling pipes are in a direction substantially perpendicular to the first and second side walls and the inlets of the first and second cooling pipes are opposite to and spaced from each other and the outlets of the first and second cooling pipes are opposite to and spaced from each other, wherein the multiple folds of square wave of the first cooling pipe are arranged between the third and fourth side walls and are distributed from the third side wall toward the fourth side wall, while the multiple folds of square wave of the second cooling pipe are arranged between the third and fourth side walls and are distributed from the fourth side wall toward the third side wall such that the inlets of the first and second cooling pipes that are respectively mounted to the first and second side walls are spaced from each other in a direction normal to the first and second side walls and are also spaced from each other in a direction normal to the third and fourth side walls, the water pump driving coolant contained in the water tank through the water drawing pipe into the first cooling pipe and the second cooling pipe inside the oven, wherein the coolant is introduced into the inlets of the first and second cooling pipes to flow through the first and second cooling pipes in opposite directions and thus removes heat from the oven and then discharged from the outlet of the first and second cooling pipes at opposite sides of the oven and to return through the water returning pipe back into the water tank;

wherein the water pump comprises a self-priming water pump;

wherein the coolant comprises water recycled from a one drop fill (ODF) liquid crystal process;

wherein the water tank functions as a buffer water storage for water recycled from an ODF liquid crystal process for use in a beveling operation;

wherein the first cooling pipe and the second cooling pipe are stainless steel pipes; and wherein the first cooling pipe and the second cooling pipe are received in and extend inside an exhaust pipe of the oven so that a gas discharge passage is formed between the exhaust pipe and the first and second cooling pipes.

\* \* \* \* \*